United States Patent
Audet

(10) Patent No.: US 10,595,680 B2
(45) Date of Patent: Mar. 24, 2020

(54) MULTIFUNCTION KITCHEN UTENSIL USEFUL FOR CLEANING A WHISK OR SIMILAR ITEM

(71) Applicant: SNV CREATIONS, INC., Quebec (CA)

(72) Inventor: Steven Audet, Quebec (CA)

(73) Assignee: EDGE DESIGN GLOBAL ENTERPRISES INC., Zhejiang (CN)

( * ) Notice: Subject to any disclaimer, the term of this patent is extended or adjusted under 35 U.S.C. 154(b) by 0 days.

(21) Appl. No.: 15/847,543

(22) Filed: Dec. 19, 2017

(65) Prior Publication Data

US 2019/0184431 A1     Jun. 20, 2019

(51) Int. Cl.
| | | |
|---|---|---|
| A47J 43/28 | (2006.01) | |
| B01F 15/00 | (2006.01) | |
| B08B 1/00 | (2006.01) | |
| A47L 17/00 | (2006.01) | |
| A47L 25/00 | (2006.01) | |

(52) U.S. Cl.
CPC ............ *A47J 43/288* (2013.01); *A47J 43/28* (2013.01); *B01F 15/00058* (2013.01); *B08B 1/005* (2013.01); *A47L 17/00* (2013.01); *A47L 25/00* (2013.01)

(58) Field of Classification Search
CPC . A47L 17/00; A47L 25/00; B08B 1/00; B08B 1/001; B08B 1/005; B08B 2240/00; A47J 43/00; A47J 43/10; A47J 43/1087; A47J 43/1093; A47J 43/28; B01F 15/00019; B01F 15/00038; B01F 15/00058

USPC .......... 15/104.001, 104.5, 142, 210.1, 220.4, 15/236.01, 236.03, 236.05–236.09, 245; 366/129, 349
See application file for complete search history.

(56) References Cited

U.S. PATENT DOCUMENTS

| | | | |
|---|---|---|---|
| 790,238 A | 5/1905 | Rohrer | |
| 2,256,650 A * | 9/1941 | Reid | A47J 43/288 15/245 |
| 2,280,225 A * | 4/1942 | Finely | A47J 43/288 15/245 |
| 2,525,341 A * | 10/1950 | Eicher | A47J 43/288 15/236.1 |
| 4,324,018 A | 4/1982 | Olsson | |
| 6,530,109 B1 * | 3/2003 | Cassedy | B05C 17/0245 15/104.04 |
| 7,971,310 B2 * | 7/2011 | Metaxatos | A46B 3/18 132/119 |

(Continued)

FOREIGN PATENT DOCUMENTS

JP      2011055917 A1 †  2/2011

*Primary Examiner* — Mark Spisich
(74) *Attorney, Agent, or Firm* — Law Office of Gerard F. Dunne; Gerard Dunne

(57) ABSTRACT

A multipurpose kitchen utensil useful for wiping the wire elements of a whisk has a working portion containing a plurality of slots arranged arcuately and extending radially in spaced relation to one another and structured to receive the wire elements of a whisk. The utensil includes a central core member formed of a material capable of maintaining its shape when subject to external pressure, and an overlying layer of a more resilient material such as silicone. The radial slots extend inwardly and taper to an edge capable as serving as a spatula.

14 Claims, 1 Drawing Sheet

(56) References Cited

U.S. PATENT DOCUMENTS

| | | | |
|---|---|---|---|
| 8,307,491 B1 * | 11/2012 | Michel | B01F 13/002 15/210.1 |
| 9,241,599 B2 † | 1/2016 | Cooper | |
| 10,086,411 B1 † | 10/2018 | Michel | |
| 2013/0014781 A1 * | 1/2013 | Bouix | A46B 17/06 134/6 |
| 2013/0068250 A1 * | 3/2013 | Michel | B08B 1/006 134/6 |
| 2014/0220201 A1 | 8/2014 | Cooper et al. | |

\* cited by examiner
† cited by third party

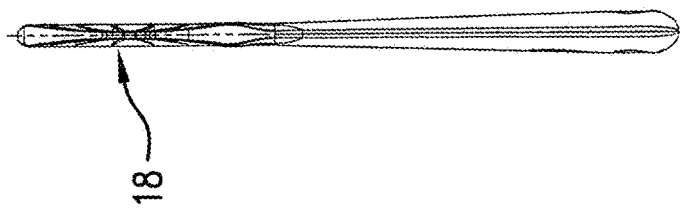
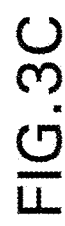
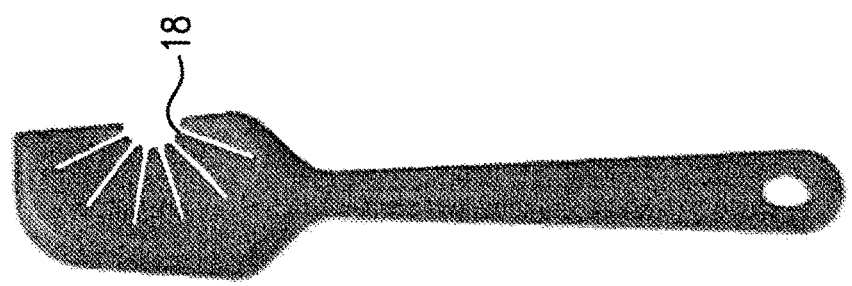
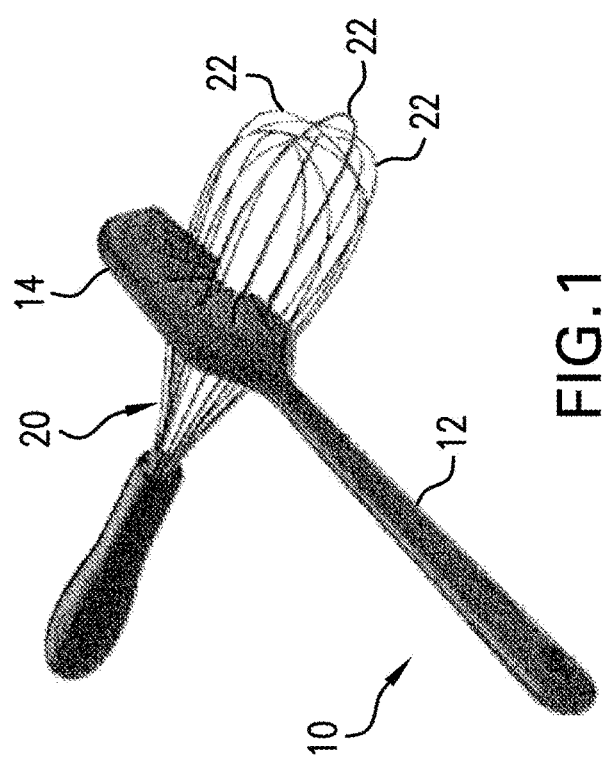
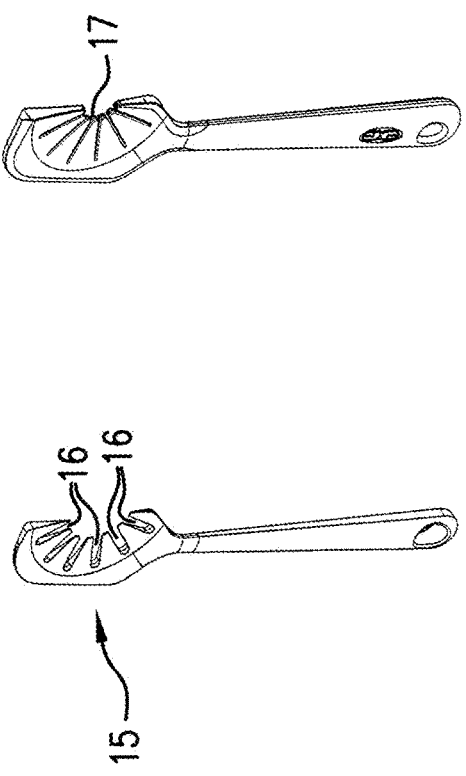

MULTIFUNCTION KITCHEN UTENSIL USEFUL FOR CLEANING A WHISK OR SIMILAR ITEM

FIELD OF THE INVENTION

The present invention relates to a kitchen utensil having a working portion formed with resilient radial slots arranged in an arcuate pattern that may be used to clean the wire elements of a whisk by wiping the wire elements through the resilient slots. The working portion containing the radial slots narrows to an edge portion that may serve as a spatula or similar scraping device.

BACKGROUND OF THE INVENTION

Many styles of cleaning utensils for the kitchen are known, and proposals have been made to provide cleaning devices for wiping the wire elements of a whisk. For example, U.S. Pat. No. 9,296,020 and its related patents describe a wiper for a whisk having a generally disc shape and a plurality of slits disposed in an asterisk pattern. The wiper is described as being mounted on a whisk with the slits being disposed to engage respective wire elements; and can be pulled off the whisk to wipe the wire elements of the whisk from food materials. This device is mounted onto the whisk during use, which can be cumbersome, and has a singular purpose of wiping the wire elements of the whisk.

Other cleaning devices, as illustrated for example in international patent application WO 2010/130826 A2 have one wire element of a whisk wider and thicker and longer to clean the sides of the bowl the whisk may be used in; but is not functional for cleaning the whisk.

These devices, however, have a use that is specific to cleaning or wiping as part of the function of using a whisk, and do not lend themselves to other tasks in the kitchen.

It is therefore an object of the present invention to provide a device for cleaning or wiping the wire elements of a whisk and yet may easily serve as a useful kitchen utensil for other purposes as well.

SUMMARY OF THE INVENTION

The present invention is illustrated by way of example in the attached drawings and provides a kitchen utensil useful for cleaning a whisk as well as use as a kitchen spatula. The kitchen utensil of the present invention includes a working portion containing a plurality of slots extending radially in an arcuate configuration and spaced from one another. The radial slots are structured to receive the wire elements of a whisk. Additionally, the radial slots may extend inwardly and taper to an edge capable as serving as a spatula; and an elongate handle may be connected to the working portion to ease use.

The utensil is preferably formed with a central core member formed of a material, such as reinforced nylon, that is capable of maintaining its shape when subject to external pressure, and an overlying layer of a more resilient material, preferably silicone. The radial slots of the overlying layer have a width narrower than the width of the radial slots of the core member to enable the wire elements of a whisk to be fitted within respective slots to wipe the wire elements by sliding the utensil relative the wire elements of the whisk.

BRIEF DESCRIPTION OF THE DRAWINGS

The attached figures illustrate a separable food utensil according to the present invention.

FIG. 1 illustrates a perspective view of an embodiment of the kitchen utensil of the present invention in one manner of use;

FIG. 2 illustrates in plan view an embodiment of a kitchen utensil according to the present invention;

FIG. 3A illustrates in reduced size the stiffer inner core member of a kitchen utensil of the present invention;

FIG. 3B illustrates in reduced size the more resilient layer overlaying the inner core member of a kitchen utensil of the present invention.

FIG. 3C illustrates a side view in reduced size of a kitchen utensil of the present invention.

DETAILED DESCRIPTION OF AN EMBODIMENT

As shown in FIG. 1, the kitchen utensil 10 is positioned partially around the wire members 22 of whisk 20; and can be slid along the wire members 22 to wipe the whisk of remaining food stuff subsequent use of the whisk. Preferably, a handle 12 connected to the working portion 14 is provided for the kitchen utensil. As can be seen in FIG. 1, the wire members 22 of a whisk can be flexed into slots formed in the kitchen utensil 10; and the kitchen utensil can be slid along the wire members 22.

The kitchen utensil of the present invention is preferably formed of two parts. An inner core member 15 is formed of a relative stiff material such as nylon with glass reinforcement, and has a plurality of radial slots 16 arranged arcuately and formed in the working portion 14. The radial slots 16 extend inwardly towards a locus and preferably taper to form an edge capable of scraping in the manner of a spatula. The inner core member 15 in the preferred embodiment is formed of a material capable of maintaining its shape when subject to external pressure.

Overlaying the inner core member is a more resilient material, preferably a silicone rubber material. The radial slots 17 of this overlying layer have a width narrower than the width of the radial slots of the core member to enable the wire elements of a whisk to be fitted within respective slots to wipe the wire elements by sliding the kitchen utensil relative the wire elements of the whisk. As shown in can be FIG. 3B, the working portion 14 tapers towards a locus of the radial slots in both the vertical and horizontal direction as shown in FIG. 3C to form an edge portion 18.

What is claimed is:

1. A kitchen utensil useful for cleaning a whisk having spaced elongate elements, said kitchen utensil having a working portion having a central core member formed of a material capable of maintaining its shape when subject to external pressure and an overlying layer of more resilient material covering at least a portion of said central core member, said working portion having an open end portion forming an edge adapted to be fitted over portions of said elongate elements of the whisk to be cleaned and containing a plurality of spaced, radial slots arranged arcuately and extending towards said edge to enable said edge to be placed adjacent said elongate elements of the whisk to fit portions of the elongate elements within said slots for cleaning said elongate elements of the whisk by wiping the utensil along said elongate elements, the working portion having a thickness which tapers along at least a portion of the radial slots and which thickness decreases along the length of said portion to a reduced thickness at said edge, said edge adapted to serve as a spatula.

2. A kitchen utensil useful for cleaning a whisk as set forth in claim 1, said radial slots extending through said central core member and said overlying layer, the radial slots of said overlying layer having a width narrower than the width of the radial slots of said core member to enable said elongate elements of a whisk to be fitted within respective slots to wipe said elongate elements by sliding the kitchen utensil relative said elongate elements of the whisk.

3. A kitchen utensil useful for cleaning a whisk as set forth in claim 2, said overlying layer being formed of a silicone material.

4. A kitchen utensil useful for cleaning a whisk as set forth in claim 1, said core member being formed of a reinforced nylon material.

5. A kitchen utensil useful for cleaning a whisk as set forth in claim 1, said core member being formed of a synthetic plastic material.

6. A kitchen utensil useful for cleaning a whisk as set forth in claim 1 including an elongate handle connected to said working portion.

7. A kitchen utensil useful for cleaning a whisk as set forth in claim 6, said radial slots extending through said central core member and said overlying layer, the radial slots of said overlying layer having a width narrower than the width of the radial slots of said core member to enable said elongate elements of a whisk to be fitted within respective slots to wipe said elongate elements by sliding the kitchen utensil relative said elongate elements of the whisk, said core member being formed of a synthetic plastic material.

8. A kitchen utensil useful for cleaning a whisk as set forth in claim 7, said core member being formed of a reinforced nylon material.

9. A kitchen utensil useful for cleaning a whisk as set forth in claim 8, said overlying layer being formed of a silicone material.

10. A kitchen utensil useful for cleaning a whisk and having a working portion having an open end portion forming an edge, said edge being adapted to be fitted over portions of elongate elements of the whisk to be cleaned and containing a plurality of slots extending radially in an arcuate configuration towards said edge, said slots being spaced from one another and structured to receive said elongate elements of a whisk, said radial slots being formed of a central core member formed of a material capable of maintaining its shape when subject to external pressure and a compressible overlying layer so as to enable said elongate elements of a whisk to be fitted within respective slots to clean said elongate elements by sliding the kitchen utensil relative said elongate elements of the whisk, the working portion having a thickness which tapers along at least a portion of the radial slots and which thickness decreases along the length of said portion to a reduced thickness at said edge to form an edge adapted to function as a spatula.

11. A kitchen utensil useful for cleaning a whisk as set forth in claim 10 including an elongate handle connected to said working portion.

12. A kitchen utensil useful for cleaning a whisk as set forth in claim 10, said radial slots extending through said central core member and said overlying layer, the radial slots of said overlying layer having a width narrower than the width of the radial slots of said core member to enable said elongate elements of a whisk to be fitted within respective slots to wipe said elongate elements by sliding the kitchen utensil relative said elongate elements of the whisk, said core member being formed of a synthetic plastic material.

13. A kitchen utensil useful for cleaning a whisk as set forth in claim 12 including an elongate handle connected to said working portion and formed by said core member and overlaying layer.

14. A kitchen utensil useful for cleaning a whisk and having a working portion having an open end portion forming an edge, said edge being adapted to be fitted over portions of elongate elements of the whisk to be cleaned and containing a plurality of slots extending radially towards said edge, said slots being spaced from one another and structured to receive said elongate elements of a whisk, said radial slots being formed of a central core member formed of a material capable of maintaining its shape when subject to external pressure and a compressible overlying layer so as to enable said elongate elements of a whisk to be fitted within respective slots to clean said elongate elements by sliding the kitchen utensil relative said elongate elements of the whisk, the working portion having a thickness which tapers along at least a portion of the radial slots and which thickness decreases along the length of said portion to a reduced thickness at said edge to form an edge adapted to function as a spatula.

\* \* \* \* \*